Aug. 20, 1940.    J. W. SRODULSKI    2,212,252
OVERLOAD CLUTCH
Filed April 9, 1938

Joseph W. Srodulski
INVENTOR.
BY Clarence E. Threedy
HIS ATTORNEY.

Patented Aug. 20, 1940

2,212,252

UNITED STATES PATENT OFFICE 2,212,252

OVERLOAD CLUTCH

Joseph W. Srodulski, Chicago, Ill.

Application April 9, 1938, Serial No. 201,092

1 Claim. (Cl. 192—56)

This invention pertains to coupling and clutch mechanisms, one of the principal objects being the provision of an overload clutch of general application, but especially suited for use with coin-controlled mechanisms.

Another object is the provision of an overload clutch which is simple in design, inexpensive to manufacture, susceptible of sensitivity adjustment and positively responsive for releasing operation when greater than a predetermined load is applied thereto.

Another object is the provision of an overload clutch of the class characterized and which is adapted for construction as an integral part of the mechanism with which it is used, or as an attachment unit of general application.

Viewed from another aspect, the improved clutch structure includes a driven member and a driving member, the driving member being arranged for rotational or pivotal movement and having a radially disposed cam slot into which is urged a cam lug on the driven member, the latter being pivoted so that movement of the same in one direction will withdraw the cam lug from the cam slot to break driving engagement between the driving and driven members, there being provided spring means of predetermined tensile strength for urging the pivoted driven member toward the driving member so as to dispose the cam lug in the cam slot as aforesaid, the former working instantly out of the latter when the applied force is greater than the opposing force of said spring.

Other novel aspects of the invention, both in its construction and operation, will appear as the following particular description proceeds in view of the annexed drawing, in which:

Fig. 4 is a top plan view of a modification of the clutch structure providing a clutch attachment of general application; while

It is to be understood that the objects of the invention and benefits to be derived therefrom may be accomplished by modifications of the precise form of construction set forth hereinafter, and the following specification is not to be considered a limitation upon the invention, except as may be expressly provided in the claim appended hereinafter.

Figure 1:
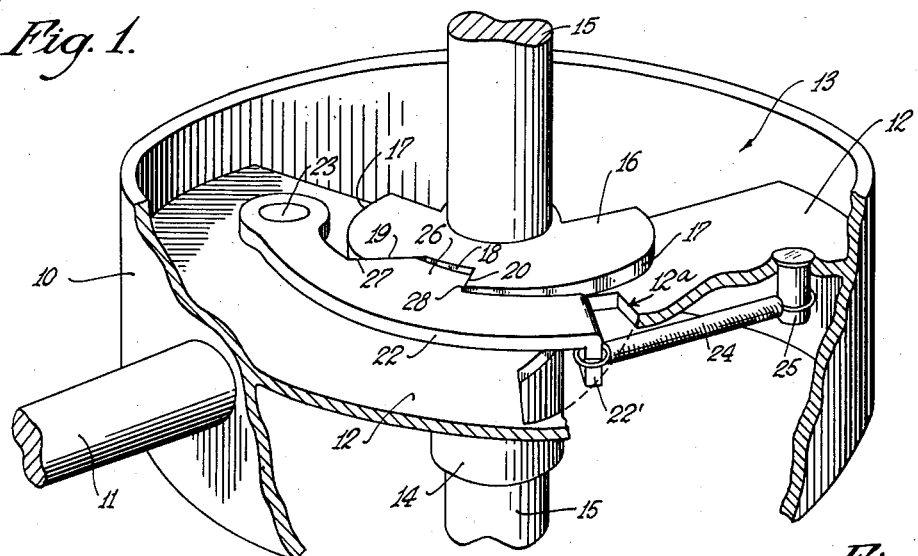
Fig. 1 is an enlarged cut-away perspective of a control unit embodying the overload clutch as a substantially integral part.

The embodiment of the invention disclosed in the cut-away perspective of Fig. 1, shows the clutch structure as a substantially integral part of a mechanism employed in a coin control for a dispensing machine, such as described and claimed in my copending aplication, Serial No. 198,105.

In the arrangement of Fig. 1, the control mechanism includes an operating drum or cylinder 10 having an operating handle 11 (see Fig. 2) extended therefrom, the drum having a web portion 12 arranged therein near one of its open or axial ends, the web 12 in turn having a segmental opening or cut-away portion 13 providing, in the device of the aforesaid copending application, a coin discharge passage or opening, not pertinent to the present construction.

Figure 3:
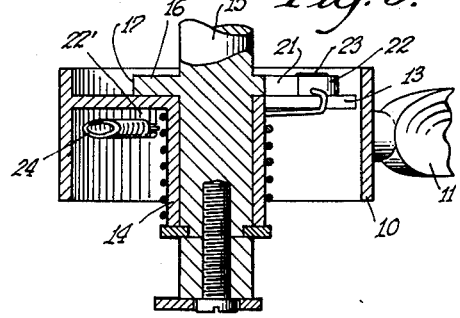
Fig. 3 is a vertical section through the unit of Fig. 2 along line 3—3 thereof.

Depending from the web portion 12 within the cylinder 10 is a sleeve or hub portion 14 (Fig. 3) through which is extended a driven shaft 15 and supportably attached to some other or driven mechanism to be driven by manipulation of the handle 11.

In the present embodiment, the driven shaft 15 has an integral driven clutch plate 16 in the form of a collar or shoulder having a concentric circumferentially arranged edge portion 17 in which there is cut a cam slot 18 having opposite side edge portions 19 and 20 slanted variously to provide cam edges. The cam edge 20 of this slot takes the main load and is only slightly pitched relative to a radial line. The other cam edge 19 has a greater pitch and facilitates reengagement of the clutch members (see also Fig. 2).

In the form of device here described, the shaft and clutch plate 15—16 may desirably be made on a screw machine or the like, although it will be obvious that these parts may be made separate and the clutch plate 16 keyed to the shaft 15 by any suitable method or means. It will be observed in the showing of Figs. 1 and 3 that the clutch plate 16 has a segmental cut-away portion 21 adapted to register with the segmental cut-away opening 13 in the web formation 12 of the operating drum. Such a formation is not essential to the clutch construction in its general application, but only in the particular embodiment described in conjunction with the control device of Fig. 1.

Figure 2:
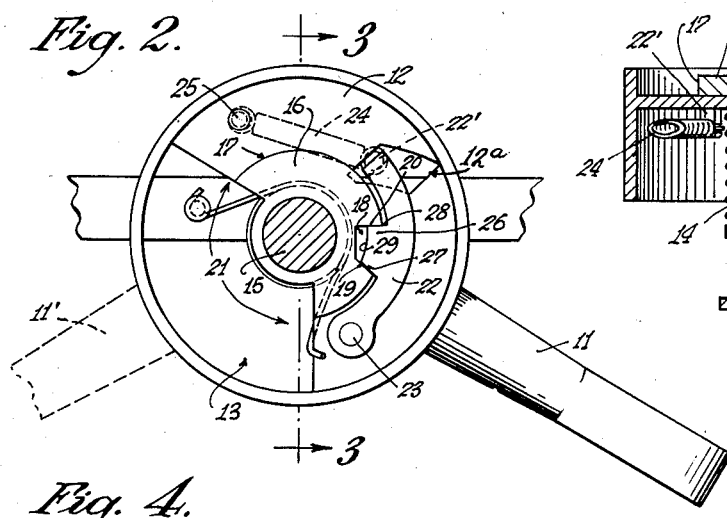
Fig. 2 is a top plan view of the device of Fig. 1.

A driving clutch member is provided as a part of the unit of Fig. 1 in the form of an arcuate clutch arm 22 pivotally mounted as at 23 on the web portion 12 of the control drum, the opposite free end portion of this arm being turned down to provide a stopping nose 22' which projects through a suitable slot 12a, formed in the web, to the under side of the latter where there is attached to the depending nose portion 22' one end of a spring 24, the opposite end of this spring being secured to a depending stud 25 arranged on the under side of the web and positioned substantially diametrically opposite the pivotal mounting 23 for the driving clutch arm in such manner that the clutch arm 22 will be urged in an anticlockwise direction (Figs. 1 and 2).

Projecting from the inner arcuate edge portion of the driving clutch arm 22 between its opposite ends, is a clutch or cam lug 26 having one cam edge 27 slanted correspondingly with the cam edge 19 of the clutch plate, the opposite edge 28 of the lug being substantially straight and corresponding with the cam edge 20 of the cam slot.

The spring 24 by virtue of its particularly described disposition urges the clutch arm 22 in an anticlockwise direction so as to project the camming lug 26 in a substantially radial sense toward the center of the clutch disc 16 for movement into the cam slot 18 when the latter is positioned before the lug. It will be observed in Fig. 2 that the cam lug 26 has an arcuate riding edge 29 between its edge portions 27 and 28, the curvature of which corresponds to that of the edge portion 17 of the clutch plate so that the latter may ride freely along the riding edge 29 of the clutch arm, should the latter be expelled from clutching engagement in the cam slot 18, the arm 22 being snapped by the spring 24 back in position to project the lug 26 into the cam slot when the clutch members are returned to their normal operative position, as seen in Figs. 1 and 2.

In the operation of the particular embodiment described in conjunction with Figs. 1 and 2, the handle member 11 is grasped and moved to the full line position shown in Fig. 2 in an anticlockwise direction from the dotted line position indicated at 11'. By such movement, it will be apparent that the drum 10 will carry with it the driving clutch arm 22, and such motion will be transmitted to the driven clutch member or plate 16 through bearing engagement of the cam edge portion 27 or 28 on lug 26 with the corresponding cam edge portion 19 or 20 in the cam slot of the clutch plate, and, providing the resistance offered by the shaft 15 and such other mechanisms as may be connected therewith, is not too great or, in other terms, is not sufficient to overcome the force of the spring 24, the shaft 15 will be turned with the drum.

However, should the load resistance of the shaft 15 be greater than a predetermined normal load for which the clutch mechanism is adapted to operate (whether the lever be turned one way or the other), the cam edge portion 28 on the lug of the clutch arm will cam or ride against the corresponding edge portion 20 in the clutch plate slot and as a result of continued attempted operation of the handle 11 against the excessive load, the clutch lug 26 will ride completely out of the slot 18 and into the edge portion 17 of the clutch plate. Such a situation may arise where, for example, the driven shaft 15 is part of a vending mechanism which is of a type incapable of further operation after the supply of vendible articles has been exhausted, so that it is impossible to turn the shaft 15. In such a case, the forced operation of the control handle 11 would obviously rupture the apparatus, and it is in such applications that the improved overload clutch finds great utility due to its sensitivity and quick response.

When the clutch has been overloaded and broken as aforesaid, it will be automatically restored for clutching operation when the control handle is returned to normal, since the spring 24 will pivot the arm 22 to position the lug 26 back in the slot 18 as soon as the lug is in register with the latter. It will be obvious to those skilled in the art that, for a given range of loads, the overload or breaking load to which the clutch will respond is determined by the strength of the spring 24 so that the clutch may be easily made adjustable by providing an adjusting screw for attachment to the end portion of the spring heretofore described as secured to the stud 25.

Figure 4:
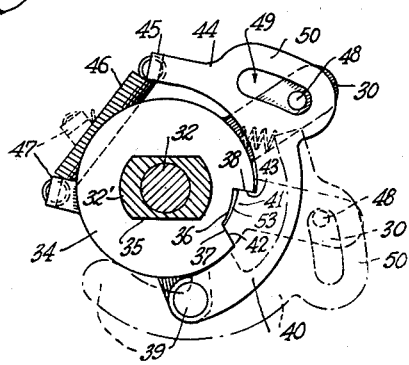
Figure 5:
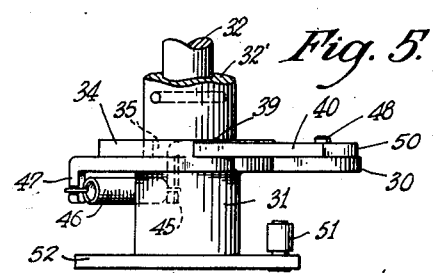
Fig. 5 is a side elevation of the device of Fig. 4 as viewed in the direction of line 5—5 thereof.

A modified form of the novel clutch is shown in the top plan view of Fig. 4 and includes a mounting plate member 30 (see also Fig. 5) provided in the present instance with a collar or sleeve portion 31 adapted to fit over a shaft 32 on which the mounting member is free to turn, the shaft 32 being the driving member associated with any desired mechanism, and the mounting plate and collar 31 constituting part of the driven assembly, the collar 31 being adapted for connection with a driven load.

A driving clutch member is provided in the form of the cam washer or plate 34 which in the embodiment of Fig. 4 is provided with a keying opening 35 having opposite straight-edge side portions fitted onto chamfered or squared portions of a shaft collar 32' pinned onto the shaft 32 so as to turn with the latter. The clutch cam plate 34 is provided at a point along its periphery with a cam formation in the form of a notch 36 having one slanted cam edge portion 37 with an opposite edge portion 38 substantially straight and directed along a line substantially parallel with a radius through the shaft 32. The cam edge is slanted or pitched away from the normal to a tangent to the periphery of the disc or plate at the juncture therewith of the cam edge.

Pivotally mounted by the headed member 39 on the mounting plate 30 is a movable clutch member in the form of an arcuate arm 40 provided between its ends along its inner arcuate edge with an interfitting, complementary or cooperating cam formation or lug 41 having a cam edge 42 adapted to confront the cam edge 37 in the clutch plate or collar, and having an opposite straight edge portion 43 cooperable with the edge 38 in the clutch plate in a manner hereinafter to appear.

The form of the clutch arm 40 is such that its opposite free end portion 44 is disposed substantially diametrically opposite its pivotal mounting 39 on the opposite side of the shaft 32, there being at this free end portion an upturned ear 45 to which is secured one end of a spring 46, the opposite end of this spring being anchored to an ear 47 struck up from the mounting plate 30 and disposed so as to urge the arm 40 in an anticlockwise direction, as seen in Fig. 4, to project the cam lug 41 into the cam slot 36.

The pivotal movement of the arm 40 is limited in opposite directions by a pin 48 projected upwardly from the mounting plate 30 through an elongated slot 49 in an offset portion 50 of the arm 40. Thus, the arm 40 may be pivoted in opposite directions predetermined distances to project and withdraw the cam lug 41 from the cam slot 36.

The driven clutch assembly includes primarily the clutch arm 40 and secondarily the mounting plate 30. Thus, it will appear that when the shaft 32 is rotated in a clockwise direction as seen in Fig. 4, the clutch collar or plate 34 turns with the shaft and causes its cam edge portion 38 to bear against the slanted cam edge portion 43 of the lug 41 on the clutch arm, the normal tendency of such a bearing force being to cam the lug out of the cam slot 36 and thus pivot the clutch arm 40 in a clockwise direction. However, the effort of the spring 46 is such that this pivotal movement of the arm 40 is prevented unless a force be applied to the driving shaft adequate to overcome the opposing force of the spring.

The driven load is taken off from the clutch mounting plate 30 by any suitable means, such for example as the roller 51 projecting laterally therefrom on means 52 and intended to have bearing engagement with a driven instrumentality, such as an operating member of a vending machine or the like. It is important to observe that the strength of the spring 46 must be proportioned adequately with the resistance of the driven load applied to the roller 51, taking into consideration also the pitch of the respective cam edge formations 20 and 38, the latter consideration also in part determining the sensitivity or the speed of response of the clutch in breaking upon overload.

The dotted line representation of the driven clutch arm 40 in Fig. 4 shows the position assumed by this arm when the clutch breaks upon overload, and attention is called to the fact that the edge portion 53 of the cam lug 41 is curved or arcuate, conformable with the peripheral curvature of the clutch plate 34 so as to ride freely on the edge of the clutch plate when the clutch breaks, the lug 41 being automatically projected back into the slot 36 when the latter returns opposite the same, either by continued revolution of the shaft or a retractive movement of the same.

Basically, the operation of the clutch of Fig. 4 is the same as that of Fig. 1, the two embodiments illustrating the adaptability of the device to various applications. In the device of Fig. 1, the clutch arm 22 and its mounting 12 constitute the driving members, and the clutch plate 16 and the shaft 15 constitute the driven members, whereas in the device of Fig. 4, the shaft 32 and the clutch plate 34 constitute the driving members, while the clutch arm 40 and its mounting plate constitute the driven members.

The preferred embodiment of the invention set forth herein has been described in detail for purposes of illustration, it being understood that the objects of the invention may be accomplished by other forms and arrangements of the specific means set forth, so that the invention is not to be limited to any precise details of form, location, or function except as may be exclusively provided hereinafter in the appended claim.

Having thus described my invention, what I claim as new and desire to protect by Letters Patent is:

An overload clutch including a drive shaft, an annular driven clutch member rotatable with said shaft, a mounting plate mounted on said shaft for free rotation thereon and disposed close to said driven clutch member, an arcuately shaped clutch arm pivotally mounted on said mounting plate with an inner arcuate edge portion substantially close to a peripheral edge portion of said driven clutch member and having a cam lug projected from said arcuate edge portion into a slot in said peripheral edge portion of the driven clutch member, said slot having a cam edge adjoining said peripheral edge portion of the driven clutch member and pitched relative to a line normal to said peripheral edge portion, said cam lug having a cam edge conformable with said first-mentioned cam edge in the slot such that when said cam lug is disposed in said slot and a turning effort applied to said driven clutch member, said cam lug will be forced out of said slot, said clutch arm having a free end portion disposed on a side of said driven clutch member substantially diametrically opposite the pivotal mounting of the clutch arm, spring means operatively connected with said free end portion of the clutch arm and urging the latter in a direction against the periphery of the driven clutch member whereby to project said lug in said slot and couple said mounting plate for rotation with said driven clutch member, said mounting plate being arranged for connection with a driven load, and said spring means being effective to maintain said lug in said slot for turning efforts applied to said shaft means and lying within predetermined limits, together with means for limiting the pivotal movement of said clutch arm relative to said clutch member and including lateral pin means projected from said mounting plate through a slot formation in said clutch arm.

JOSEPH W. SRODULSKI.